United States Patent
Schreter

(10) Patent No.: US 12,468,731 B2
(45) Date of Patent: Nov. 11, 2025

(54) CLOUD DATABASE STORAGE SYSTEM

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 79 days.

(21) Appl. No.: 18/341,900

(22) Filed: Jun. 27, 2023

(65) Prior Publication Data

US 2025/0005042 A1    Jan. 2, 2025

(51) Int. Cl.
*G06F 16/27*     (2019.01)

(52) U.S. Cl.
CPC .................. *G06F 16/278* (2019.01)

(58) Field of Classification Search
CPC ..................................... G06F 16/278
See application file for complete search history.

(56) References Cited

U.S. PATENT DOCUMENTS

| | | | |
|---|---|---|---|
| 2017/0075965 A1* | 3/2017 | Liu | G06F 16/2386 |
| 2019/0012105 A1* | 1/2019 | Schreter | G06F 3/0611 |
| 2022/0382650 A1 | 12/2022 | Schreter | |
| 2023/0177086 A1* | 6/2023 | Mritunjai | H04L 67/1095 |
| | | | 707/634 |

OTHER PUBLICATIONS

Communication: "Extended European Search Report", Dec. 5, 2024 (Dec. 5, 2024), European Patent Office, for European Application No. 24183409.2-1203, 11 pages.

\* cited by examiner

*Primary Examiner* — Van H Oberly
*Assistant Examiner* — Samuel C Sharpless, III
(74) *Attorney, Agent, or Firm* — Buckley, Maschoff & Talwalkar LLC

(57) ABSTRACT

Systems and methods include storage of database table shards on a plurality of storage nodes. Each shard may be stored as multiple replicas, where each replica of a given shard is stored on a different storage node. In case of a failure of a given storage node, all shard replicas which were stored on the given storage node are copied from other storage nodes to new or existing storage nodes. A storage node may store shards of database tables associated with multiple tenants.

14 Claims, 14 Drawing Sheets

CLOUD DATABASE STORAGE SYSTEM

BACKGROUND

Modern organizations often utilize a system landscape consisting of distributed computing systems providing various computing services. For example, an organization may deploy services within computing systems located in on-premise data centers (which themselves may be located in disparate geographic locations) and within data centers provided by one or more Platform-as-a-Service (PaaS) providers. The computing systems may comprise cloud-based computing systems (e.g., providing services using scalable-on-demand virtual machines).

In a Software-as-a-Service (SaaS) model, a service provider deploys a service (e.g., a database) onto cloud-based computing systems (which may in some instances be provided by a separate PaaS provider). The service may be used by a customer in exchange for payment of a fee to the service provider. The customer is not involved with the operation, management and scaling of the service, all of which are performed by the service provider.

In the case of a database provided as a service, a service provider attempts to ensure scalability on both the storage and the compute layers of the database. Some deployments disaggregate the storage and the compute layers by utilizing a separate cluster of nodes for each layer. This disaggregation (theoretically) allows independent scaling of the layers.

The storage layer of such a database service may consist of many storage nodes, each of which contains local disk space and computing resources (e.g., RAM and CPU) to execute a storage node process. Typically, the database service is a single-tenant system and all of the storage nodes of the storage layer in combination store a single database. Since each tenant requires a separate storage layer, these systems are cost-prohibitive for a small tenant. For larger tenants, the elasticity of such systems is unsuitable since the addition or deletion of individual storage nodes does not provide suitably-fine scaling increments.

The failure of a database instance results in a correlated failure of all tenants hosted on that database instance, referred to as a large "blast radius". To provide high availability, traditional database systems continuously replicate an entire primary database instance to a separately-running failover instance. Users are switched to the failover instance if the primary instance fails. While such systems reduce perceived downtime to seconds, they require additional costly infrastructure (i.e., the failover instance) and considerable time to recover full redundancy (i.e., via replication of the entire database from the failover instance to a new instance).

To provide sufficient performance, networking resources are provisioned to provide suitable bandwidth for data-intensive operations such as recovery and scaling. The resources are therefore overprovisioned for typical loads and result in wasted costs.

What is needed are systems to reduce the blast radius of storage node failures and the time and resources required for full redundancy after storage node failures.

DETAILED DESCRIPTION

Figure 1:
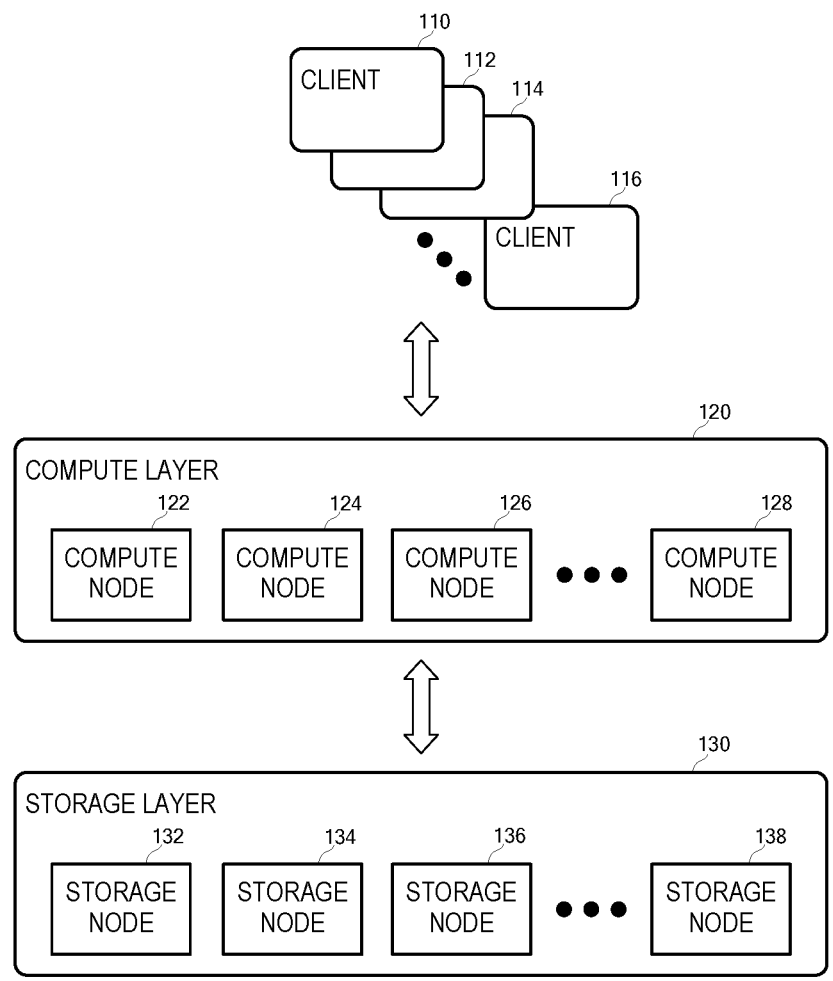
FIG. 1 illustrates a distributed database system according to some embodiments.

The following description is provided to enable any person in the art to make and use the described embodiments. Various modifications, however, will remain readily-apparent to those in the art.

According to some embodiments, the data of each tenant of a database system is logically split into shards and the shards of a given tenant are distributed across a plurality of storage nodes. The shards are large enough to amortize costs of operations on individual data items by allowing batch request processing, and small enough to allow suitably fast entire-shard operations (e.g., for backup/recovery, shard relocation). The shards may be substantially equally-sized and in the range of 1 GB-10 GB per shard in some embodiments.

Over time, data added to a shard may cause the shard to grow larger than a specified maximum shard size. In this case, the shard may be split into two shards, with one of the two shards remaining on the original storage node and the other shard being migrated to another storage node. Similarly, if the size of a shard shrinks below a specified minimum shard size, the shard may be merged with a shard associated with an adjacent key range, which may be located on a different storage node. Embodiments may therefore provide fine-grained elastic space allocation per tenant by maintaining as many shards as needed for the particular tenant.

Embodiments may also decorrelate storage node failures. Specifically, the failure of a storage node restricts access to the shards stored on the storage node but not to other shards stored on other storage nodes. Assuming a large number of storage nodes over which each tenant's shards are distributed relatively evenly, a storage node failure would render only a small portion of a given tenant's data unavailable.

Such unavailability would likely be fleeting in view of the recovery options described herein.

Moreover, since the data of a tenant is distributed across storage nodes, a compute node may access the data in parallel in some embodiments. For example, instead of scanning a large table located on a single storage node, embodiments may allow a compute node to simultaneously query hundreds of storage nodes which include the shards of the table. This parallelization may provide at least an order of magnitude improvement in performance in some scenarios.

To achieve high availability, each shard can be replicated multiple times among disparate storage nodes. The relatively small size of the shards and large node-to-node bandwidth allow such replication to proceed quickly. Upon the failure or decommissioning of a storage node, the data of all shards stored by that storage node remains accessible via the replicas of those shards which are stored on other storage nodes.

Further, since the replicas of the shards are normally distributed across the entire remaining storage system, the surviving nodes are able to generate new replicas to restore full redundancy. For example, a replica of each shard may be transmitted from its storage node to a new storage node. When the shards of a database are distributed over many storage nodes, the re-replication of data to restore full redundancy of the database may proceed in parallel across all nodes (i.e., using non communication rather than 1:1 communication). Thus, the restoration of full redundancy may be completed within seconds in some embodiments. In contrast, other systems require redistribution of an entire database and/or copying of the data of an entire node over the network to adjust for a failed node.

The assignment of disk space to tenants in small units and sharing of storage infrastructure across tenants significantly lowers the fixed costs per tenant (i.e., to the cost of the smallest possible shard size) in comparison to systems which require at least one separate virtual machine per tenant. Some embodiments employ a stateless compute layer in which the compute layer can be shared across tenants, further driving the incremental cost for a small tenant to near zero.

FIG. 1 illustrates a system according to some embodiments. The illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Clients 110-116 may comprise computing systems executing applications or services which issue database queries. Clients 110-116 may issue the database queries in response to requests input thereto by users (not shown). Compute layer 120 receives the queries (e.g., via APIs provided by compute layer 120) and operates in conjunction with data stored within storage layer 130 to provide corresponding query results to clients 110-116.

Compute layer 120 includes a plurality of compute nodes 122-128. Similarly, storage layer 130 includes a plurality of storage nodes 132-138. Each of nodes 122-128 and 132-138 includes at least one processing unit (e.g., a CPU), random access memory, and at least one data storage device (e.g., an NVMe SSD), and may comprise a single computer server, a group of computer servers, a virtual machine and any other combination that is or becomes known. In some embodiments, compute layer 120 is fully stateless and booted over the network, therefore compute nodes 122-128 are not required to include a storage device.

In some embodiments, compute layer 120 and storage layer 130 are implemented by a Kubernetes cluster. Kubernetes is an open-source system for automating deployment, scaling and management of containerized applications. A Kubernetes cluster consists of many nodes, which in turn may comprise physical servers and/or virtual machines. A node executes an application within a software container. One or more containers may be grouped into a pod, where each container of a given pod shares the same computing resources and local network.

According to some embodiments, FIG. 1 represents a single-tenant database system. Storage nodes 132-138 store data associated with a single tenant and compute nodes 122 handle queries received from clients 110-116 operated by users of the single tenant. As mentioned above, each of storage nodes 132-138 stores respective shards of the data associated with the single tenant so as to provide parallelization and elasticity.

FIG. 1 may represent a multi-tenant database system in some embodiments. In such an implementation, storage nodes 132-138 store data associated with multiple tenants. The data is stored in shards which are distributed across storage nodes 132-138. Each of compute nodes 122-128 may execute a tenant-specific single-tenant database instance. Accordingly, in a case that client 110 is being accessed by a user of a first tenant, queries issued by client 110 are directed to the one of compute nodes 122-128 which is associated with the first tenant.

In yet another example, storage nodes 132-138 store data associated with multiple tenants, and each of compute nodes 122-128 executes a multi-tenant database instance. Accordingly, any of compute nodes 122-128 are capable of handling queries received from clients 110-116 regardless of the tenant whose data is being queried.

Figure 2:
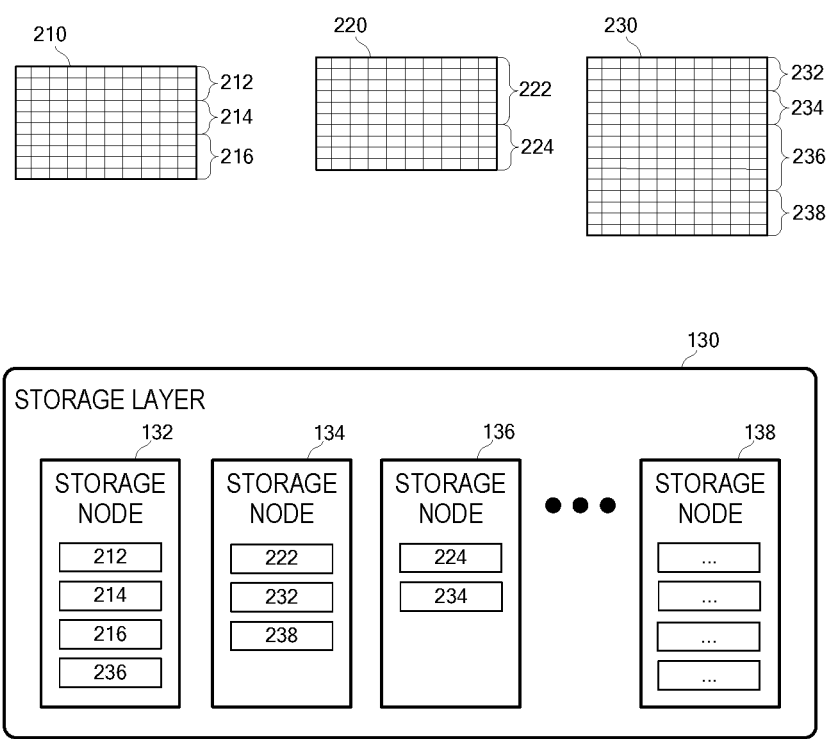
FIG. 2 illustrates storage of database table shards on a plurality of storage nodes according to some embodiments.

FIG. 2 illustrates storage of database table shards of a single tenant on a plurality of storage nodes according to some embodiments. Database tables 210, 220 and 230 are logical representations of data associated with a given database tenant. Database tables 210, 220 and 230 may conform to a particular schema as is known in the art. According to some embodiments, each row of each of database tables 210, 220 and 230 includes values describing an instance of an object. Embodiments are not limited to any types of objects.

Each of database tables 210, 220 and 230 is split into multiple shards. Specifically, database table 210 is split into shards 212, 214 and 216, database table 220 is split into shards 222 and 224, and database table 230 is split into shards 232, 234, 236 and 238. Each shard is associated with a key range. The shards may be substantially equally-sized and the size of each shard may be between 1 GB and 10 GB in some embodiments. Embodiments include any algorithm for splitting a table into shards and for defining the key ranges of the shards. In one implementation, storage layer 130 is a key/value store and the key range of a shard is the key range of stored keys in that shard. According to some embodiments, a shard may include data of more than one database tables.

According to the present example, the shards are stored across storage nodes 132, 134 and 136 of storage layer 130. Storage node 132 stores shards 212, 214, 216 and 236, storage node 134 stores shards 222, 232 and 238, and storage node 136 stores shards 224 and 234. It is assumed that storage node 138 and any other storage nodes of storage layer 130 store shards of other unshown database tables of the tenant.

The distribution of the shards across the storage nodes of storage layer 130 may be based on any suitable algorithm. Since storage node 132 stores all shards 212, 214, 216 of table 210, failure of node 132 results in inaccessibility of all of the data of table 210. In some embodiments, each shard of a table is preferably stored on a different node (e.g., shards 222 and 224 of table 220), such that failure of a node results in inaccessibility of at most one shard of the table. Some embodiments may store at most one shard of a given tenant per storage node.

Figure 3:
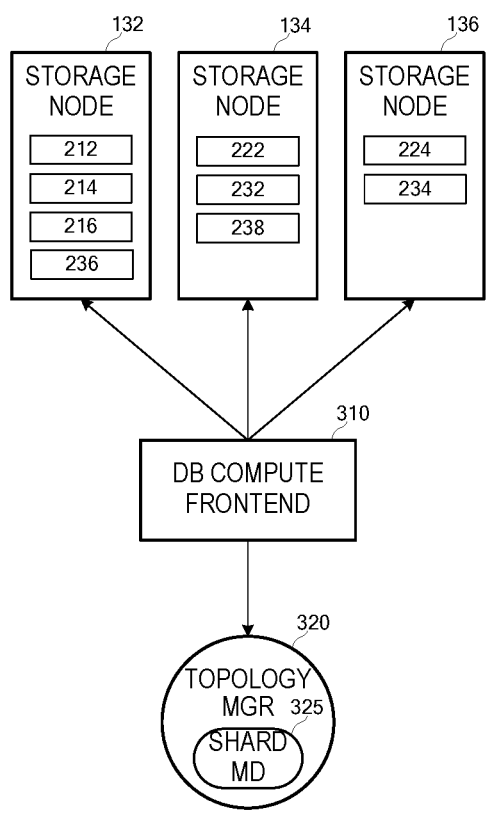
FIG. 3 illustrates access to database table shards according to some embodiments.

FIG. 3 illustrates access to database table shards according to some embodiments. Database compute frontend 310 may comprise a database instance executing on a compute node as described above. Database compute frontend 310 may need to access database table data in response to a query received from a client. However, due to the shard storage described above, database compute frontend 310 must initially determine the location of the shards containing the desired data in order to direct its requests to the appropriate storage node(s).

Topology manager 320 consists of one or more nodes which store shard metadata 325. Shard metadata 325 may be associated with a well-known ID in the system and be stored in one or more storage nodes 132 through 136 in the same manner as the other shards stored herein. According to some embodiments, shard metadata 325 specifies the storage locations of the database shards. For example, shard metadata 325 may identify each shard by a table id and a key range. Moreover, each shard is also associated with an identifier of a storage node on which it is stored. Accordingly, database compute frontend 310 queries topology manager 320 for the location of the shards associated with a query (e.g., all shards of a given table) and receives in return an indication of the storage node(s) in which the desired shard(s) are stored. Database compute frontend 310 then issues database operations to the node(s) on which the shard(s) are stored. As described above, the operations may advantageously be performed in parallel if the shards are located on more than one storage node.

In some embodiments, creation of a tenant causes creation of a single shard on a storage node. This shard may be considered a root shard which, rather than topology manager 320, includes shard metadata 325 associated with the tenant. Therefore, in response to a received query, database compute frontend 310 queries topology manager for the location of the root shard of the tenant associated with a query, retrieves the shard metadata from the root shard, and determines the storage node(s) in which the desired shard(s) are stored based thereon.

Figure 4:
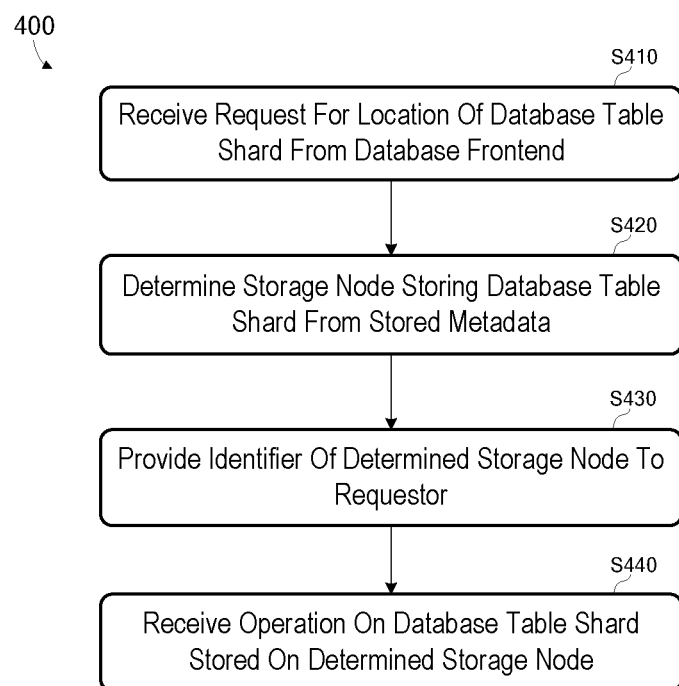
FIG. 4 is a flow diagram of a process to access database table shards on storage nodes according to some embodiments.

FIG. 4 is a flow diagram of process 400 to access database table shards on storage nodes according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Process 400 assumes the prior storage of database table shards on multiple storage nodes as described above. At S410, a request is received for the location of a database table shard. The request may identify the shard using a database table identifier and one or more primary keys (or a primary key range) of the identified table. The request is received from a database frontend, which may be executing on a compute node of a compute layer as described above. The shard may include data required to serve a query received from a client application by the database frontend.

In response to the request, a storage node storing the shard is determined based on stored metadata. According to some embodiments, the stored metadata is shard metadata stored by a topology manager as described above. Such a topology manager may therefore receive the request at S410 and determine the storage node based on the request and the shard metadata at S420. In one example, the request includes a database table identifier and a primary key range. The topology manager may determine a shard which includes the primary key range of the identified table based on the shard metadata at S420, and further determine a storage node storing the shard based on the shard metadata. In some embodiments, S420 includes determination of a root shard of a tenant associated with the query and determination of the storage node(s) in which the desired shard(s) are stored based on metadata stored in the root shard. An identifier of the determined storage node(s) is provided to the requestor at S430.

It may be determined at S420 that the primary key range spans two or more shards, in which case the storage nodes storing the two or more shards are determined at S420. In another example, the request includes only a table identifier and no primary keys or key range. Accordingly, S420 includes determination of all shards of the identified table and their corresponding storage nodes. The received request may include any number of table identifiers and associated key ranges.

A database operation on the shard is received at the database node on which the shard is stored at S440. The database operation may be issued by the database frontend from which the request was received at S410, and may utilize the identifier provided at S430. If more than one storage node has been identified, a database operation may be issued to and received at each other node at S440, thereby enabling parallel execution of the operations by the more than one storage nodes.

Figure 5A:
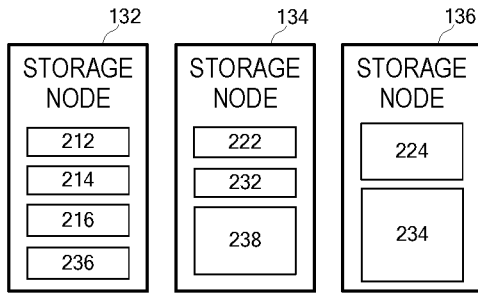
FIGS. 5a through 5c illustrate a scale-out process according to some embodiments.
Figure 5B:
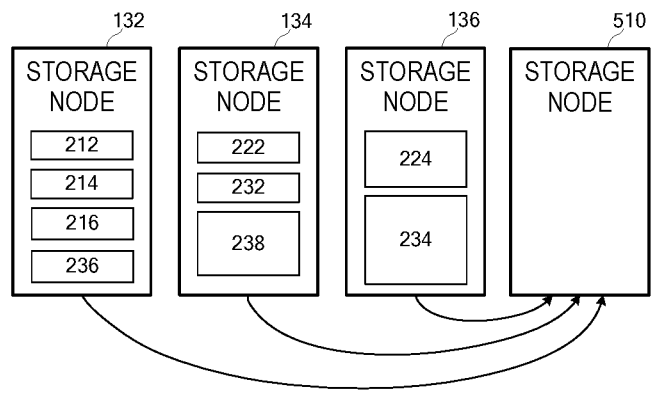
Figure 5C:
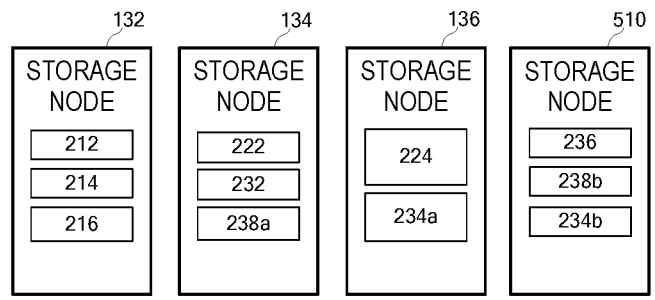

FIGS. 5a through 5c illustrate a scale-out process according to some embodiments. Storage nodes 132, 134 and 136 of FIG. 5a store respective shards, some of which have grown in size with respect to FIG. 3. It may therefore be manually or automatically (based on resource consumption parameters) determined to reduce the amount of storage consumed by one of the storage nodes by adding another storage node to the corresponding storage layer. Such a determination may be performed by a topology manager according to some embodiments. It may also or alternatively be determined to divide shards 234 and 238 because their size exceeds a specified maximum shard size.

FIG. 5b illustrates the addition of storage node 510 to the storage layer. FIG. 5b also illustrates the movement of shards from each of storage nodes 132, 134 and 136 to storage node 510. The movement may be intended to achieve load balancing which reducing the memory consumption per node.

FIG. 5c illustrates the resulting storage layer. As shown, shard 236 has moved from storage node 132 to storage node 510. Shard 238 has been divided into shards 238a and 238b and shard 238b has moved from storage node 134 to storage node 510. Similarly, shard 234 has been divided into shards 234a and 234b and shard 234b has moved from storage node 136 to storage node 510. Embodiments are not limited to division of a shard into equally-sized shards.

Advantageously, the shards moved to node 510 are each moved over different (and substantially independent) node-to-node network connections. Movement of the shards therefore may occur substantially faster than in a case where all three shards travel from a single node to node 510. Moreover, this movement only requires the nodes from which the shards are moved to use 1/n of their respective bandwidth. Consequently, impact on node performance and system response time is minimal.

Division of a shard and movement of the resulting shards may occur with or without the addition of a storage node. Addition of a storage node and movement of shards thereto may also occur with or without dividing any shards.

Figure 6A:
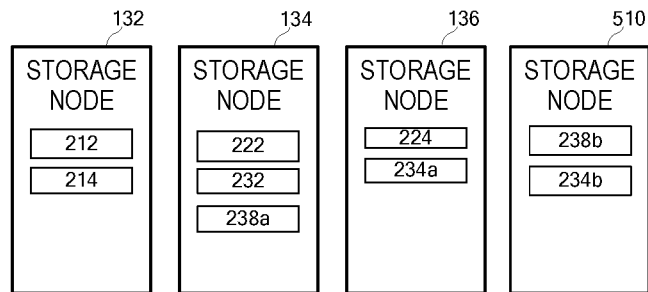
FIGS. 6a through 6c illustrate a scale-in process according to some embodiments.
Figure 6B:
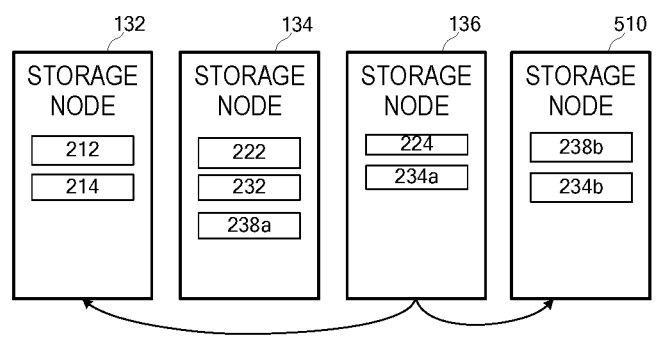
Figure 6C:
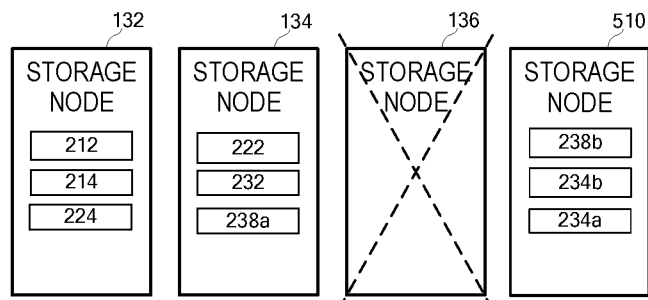

FIGS. 6a through 6c illustrate a scale-in process according to some embodiments. FIG. 6a illustrates storage nodes 132, 134, 136 and 138 in which some shards are smaller than shown in FIG. 5c. It may therefore be manually or automatically (again, based on resource consumption parameters) determined to reduce the number of storage nodes of the corresponding storage layer. This determination may be performed by a topology manager according to some embodiments.

In the present example, it is determined to decommission storage node 136. Accordingly, FIG. 6b illustrates the movement of the shards of storage node 136 to storage nodes 132 and 510. The storage nodes to which the shards are moved are determined so as to achieve load balancing in some embodiments.

FIG. 6c illustrates the resulting storage layer, in which shard 224 has moved from storage node 136 to storage node 132 and shard 234a has moved from storage node 136 to storage node 510. Storage node 136 no longer stores any shards and may therefore be decommissioned. According to some embodiments, scaling-in may also or alternatively include merging two or more small shards into one shard, and placing the one shard on a storage node based on load balancing and resource consumption considerations. Due to the key range associated with each shard, shards should only be merged with shards that are associated with an adjacent key range according to some embodiments.

Figure 7:
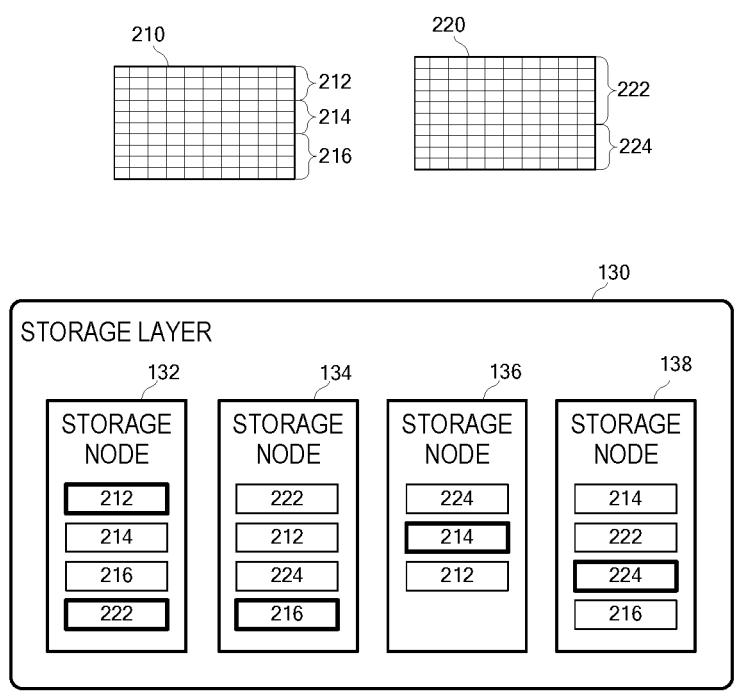
FIG. 7 illustrates storage of database table shard replicas on a plurality of storage nodes according to some embodiments.

FIG. 7 illustrates storage of database table shard replicas of a single tenant on a plurality of storage nodes according to some embodiments. As described with respect to FIG. 2, database tables 210 and 220 and 230 are logical representations of data associated with a given database tenant and are split into multiple shards associated with different key ranges.

As shown in FIG. 7, storage layer 130 store multiple replicas of each of shards 212, 214, 216, 222 and 224. Replication may be performed in any suitable manner such as by using a consensus protocol, employing erasure codings across replicas, etc., each of which may exhibit different advantages and disadvantages based on the use case. The distribution of the replicas across the storage nodes of storage layer 130 may be based on any suitable-algorithm which may provide load-balancing and high availability.

Although three replicas per shard are illustrated in FIG. 7, embodiments may utilize any number of replicas. In the case of a protocol which replicates each shard across three different storage nodes, the data of a particular shard remains fully accessible if one of the three storage nodes serving this shard fails or is decommissioned. If the replication factor is set greater than three, then the system continues normal operation even in the case of multiple node failures (e.g., two node failures using a replication factor of five, or in general k node failures with a replication factor of 2k+1).

FIG. 7 reflects a consensus protocol in which each shard is represented by a leader replica and two follower replicas. The leader replica is determined by a leader election algorithm and is denoted by a pronounced outline in FIG. 7. All operations on a given shard are directed to the storage node which stores the leader replica of the shard, and changes thereto are replicated to the follower replicas of the shard. If a node including a leader replica of a shard fails, one of the remaining follower replicas of the shard is designated the leader replica and the new leader replica begins to replicate its changes to the remaining follower replicas. Moreover, as will be described below, a new follower replica is quickly instantiated on another (or new) storage node to reestablish the desired consensus protocol.

Figure 8:
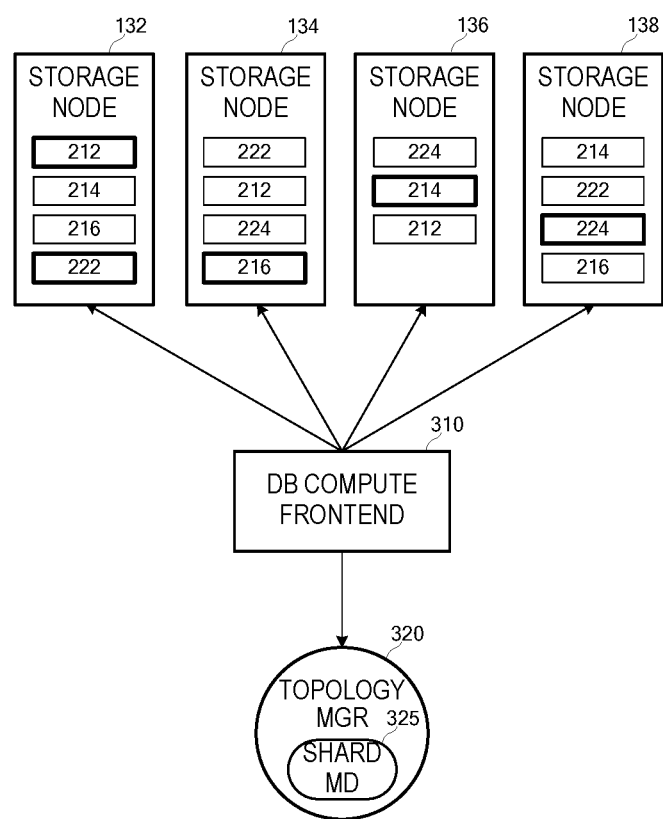
FIG. 8 illustrates access to database table shards according to some embodiments.

FIG. 8 illustrates access to leader replicas of shards according to some embodiments. Database compute frontend 310 determines the location of the leader replicas of shards containing the desired data in order to direct its requests to the appropriate storage node(s). Shard metadata 325 of topology manager 320 specifies the storage locations of all replicas of each shard and notes the current leader replica of each shard. If a storage node including a leader replica of a shard fails or is decommissioned, a new leader replica of the shard is elected and shard metadata 325 is updated accordingly. Any follower replicas stored on the failed/decommissioned storage node are removed from shard metadata 325. Shard metadata 325 also specifies a table ID and a key range of each shard.

Accordingly, database compute frontend 310 queries topology manager 320 for the location of the shards associated with a query (e.g., all shards of a given table) and receives therefrom an identifier of the storage node(s) in which the leader replicas of the desired shard(s) are stored. Database compute frontend 310 then issues database operations to the node(s) on which the leader replicas shard(s) are stored. Again, the operations may advantageously be performed in parallel if the shards are located on more than one storage node.

Database compute frontend 310 may also receive identifiers of the storage nodes in which the follower replicas of the desired shard(s) are stored. Accordingly, if an operation to an identified leader replica fails, database compute frontend 310 may seamlessly retry the operation on one of the corresponding follower replicas stored on a different storage node.

In some embodiments, a root shard stores shard metadata 325 instead of topology manager 320, and topology manager 320 merely stores the location of the root shard. The root shard may also be stored among storage nodes 132-138 in multiple replicas, in which case topology manager 320 stores the location of each replica.

Figure 9A:
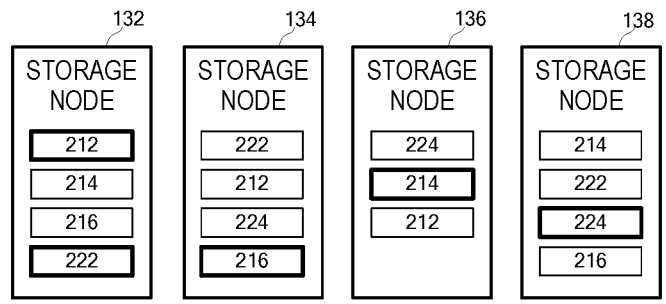
FIGS. 9a through 9c illustrate a scale-out process using database table shard replicas according to some embodiments.
Figure 9B:
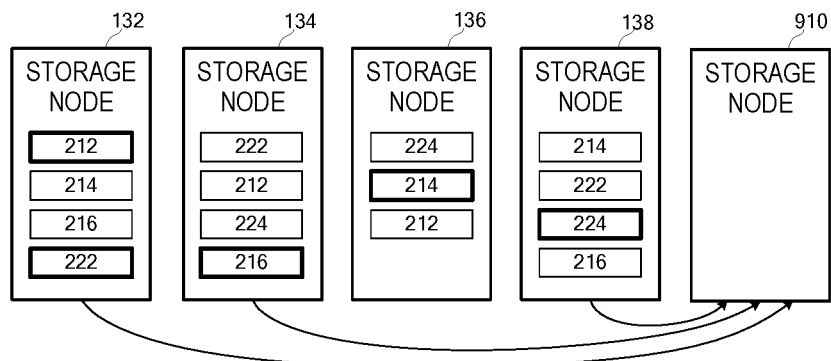
Figure 9C:
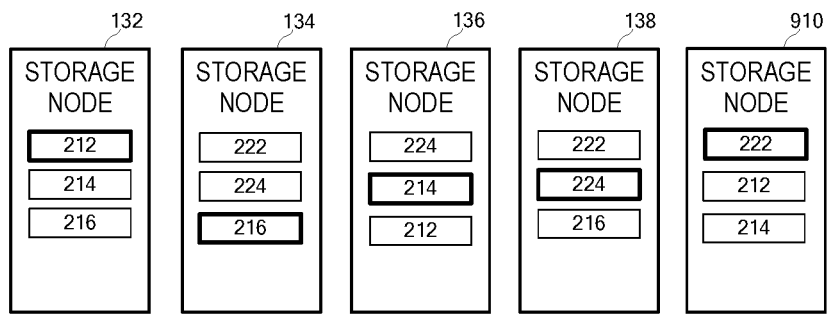

FIGS. 9a through 9c illustrate a scale-out process using database table shard replicas according to some embodiments. Storage nodes 132, 134, 136 and 138 of FIG. 9a store respective shards as shown in FIGS. 7 and 8. It will be assumed that it is manually or automatically determined to add another storage node to the corresponding storage layer to, for example, reduce the amount of storage consumed by one of the storage nodes or provide improved availability.

FIG. 9b illustrates the addition of storage node 910 to the storage layer. As also illustrated in FIG. 9b, shards are moved from each of storage nodes 132, 134 and 138 to storage node 910. FIG. 9c illustrates the resulting storage layer. Shard 222 has moved from storage node 132 to storage node 910, shard 212 has moved from storage node 134 to storage node 910, and shard 214 has moved from storage node 138 to storage node 910. In all examples described herein, shard metadata 325 is updated to reflect new replica storage locations due to movement of shards between storage nodes.

The shards are moved to node 910 over different (and substantially independent) node-to-node network connections (i.e., 132 to 910, 134 to 910 and 138 to 910). By copying one shard rather than three, nodes 132, 134 and 138 are respectively taxed much less than other implementations.

Figure 10A:
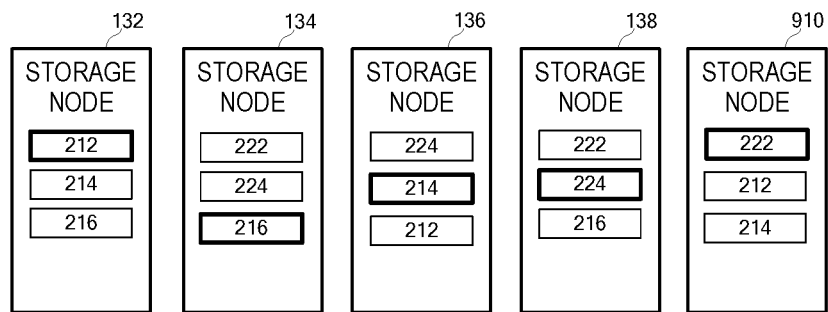
FIGS. 10a through 10c illustrate a scale-in process using database table shard replicas according to some embodiments.
Figure 10B:
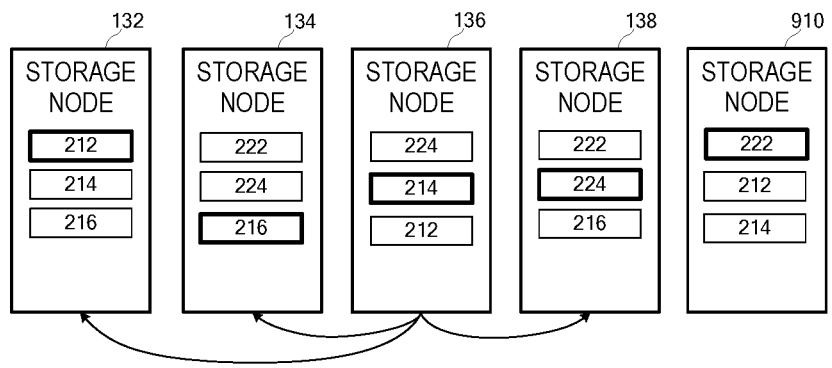
Figure 10C:
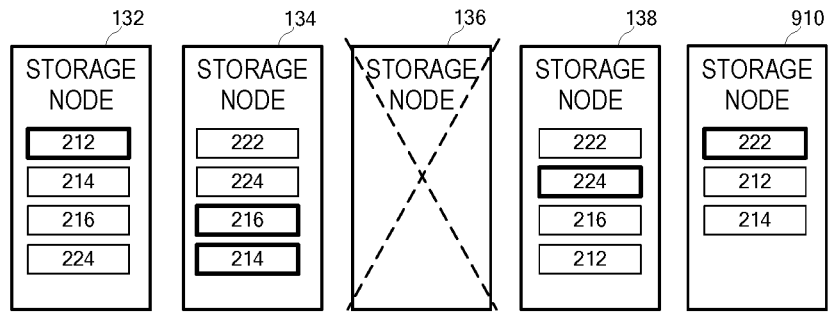

FIGS. 10a through 10c illustrate a scale-in process using database table shard replicas according to some embodiments. FIG. 10a reflects a storage layer as described with respect to FIG. 9c. It will be assumed that it is manually or automatically determined to decommission storage node 136, perhaps based on under-utilization of one or more storage nodes of the depicted storage layer.

FIG. 10b illustrates the movement of the shards of storage node 136 to storage nodes 132, 134 and 138. The shards to be moved and the storage nodes to which the shards are moved may be determined based on a load-balancing and/or resource consumption algorithm in some embodiments. FIG. 10c illustrates the resulting storage layer, in which shard 224 has moved from storage node 136 to storage node 132, shard 214 has moved from storage node 136 to storage node 134, and shard 212 has moved from storage node 136 to storage node 138. Since storage node 136 no longer stores any shards, it may be decommissioned. Shard metadata 325 is then updated to reflect new replica storage locations due to the above-described movement of shards between storage nodes.

Figure 11A:
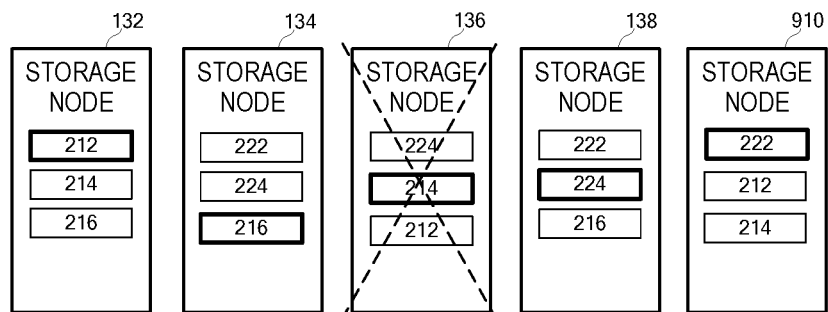
FIGS. 11a through 11c illustrate a recovery process using database table shard replicas according to some embodiments.
Figure 11B:
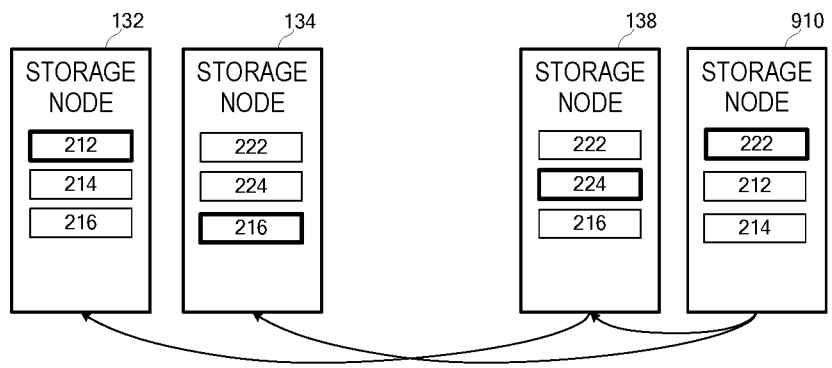
Figure 11C:
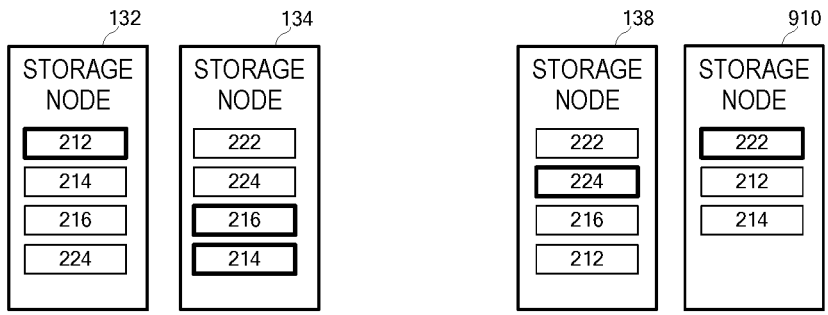

FIGS. 11a through 11c illustrate a recovery process using database table shard replicas according to some embodiments. FIG. 11a reflects a storage layer as described with respect to FIG. 10a, but in this case it is assumed that storage node 136 unexpectedly fails. In some implementations, decommissioning of node 136 may also proceed as described below with respect to FIGS. 11a-11c.

Upon detecting the failure, topology manager 320 accesses shard metadata 325 to determine the shards which were stored on storage node 136. Next, topology manager 320 identifies, based on shard metadata 325, which of the remaining storage nodes stores replicas of the shards which were stored on storage node 136. Topology manager 320 then instructs the storage layer to copy a replica of each of the shards which were stored on storage node 136 from a remaining storage node to a different remaining storage node.

FIG. 11b illustrates the copying of the replicas of each of the shards which were stored on failed storage node 136 to other storage nodes. For example, shard metadata 325 indicates that failed storage node 136 stored replicas of shards 224, 214 and 212, and that the replica of shard 214 was a leader replica. Shard metadata 325 also indicates that replicas of shard 224 are located on nodes 134 and 138, replicas of shard 214 are located on nodes 132 and 910, and replicas of shard 212 are located on nodes 132 and 910. Accordingly, FIG. 11b illustrates the copying of shard 224 from node 138 to node 132, of shard 214 from node 910 to node 134, and of shard 212 from node 910 to node 138. As noted above, copying between different sets of nodes allows each copy operation to proceed in parallel and to use the full available node-to-node bandwidth. FIG. 11c illustrates the resulting storage layer after completion of the copy operations.

The particular storage nodes from and to which the shards are copied may be determined based on a load-balancing and/or resource consumption algorithm according to some embodiments. Shard metadata 325 is updated to reflect the new replica storage locations. The update may also include election of the replica of shard 214 stored in node 134 as the leader replica, and indication of the election in shard metadata 325.

Figure 12:
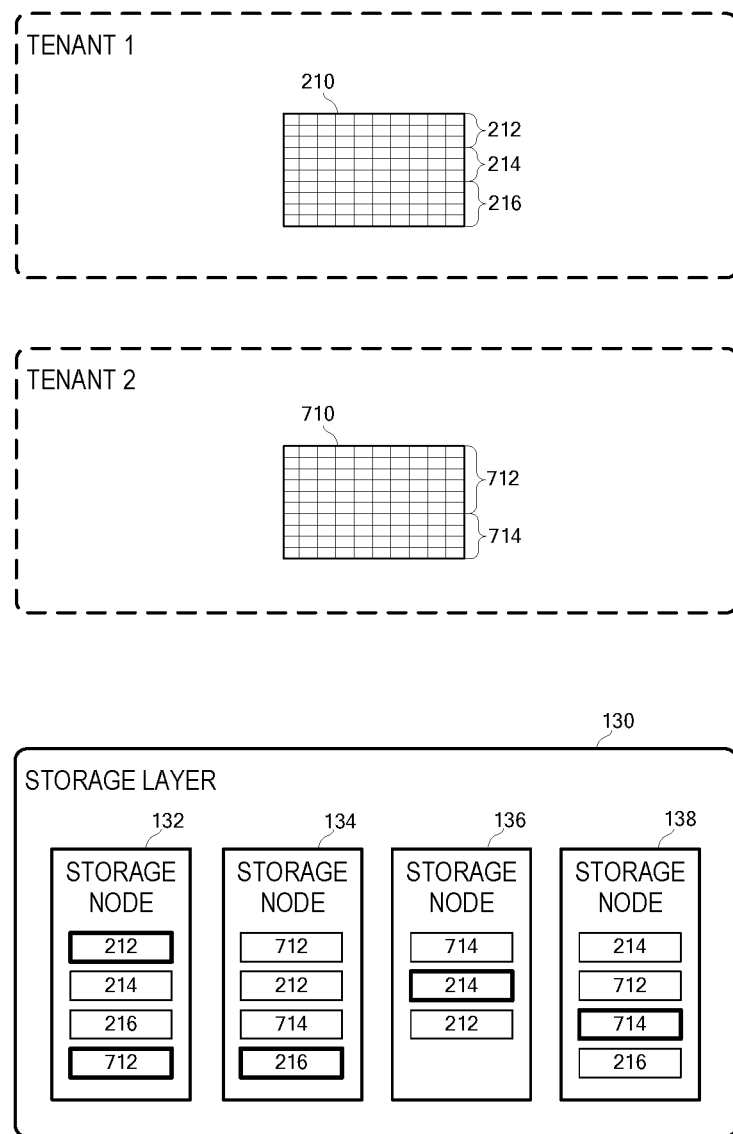
FIG. 12 illustrates storage of database table shard replicas of multiple tenants on a plurality of storage nodes according to some embodiments.

FIG. 12 illustrates storage of database table shard replicas of multiple tenants on a plurality of storage nodes according to some embodiments. Database table 210 includes data of Tenant 1 and database table 710 includes data of Tenant 2. Database table 210 conforms to a schema associated with Tenant 1 and database table 710 conforms to a schema associated with Tenant 2. Each tenant may be associated with many other database tables including their respective data. As is known in the art, the data of Tenant 1 is intended to be accessible only to users of Tenant 1 and the data of Tenant 2 is intended to be accessible only to users of Tenant 2.

In the illustrated example, table 210 is divided into shards 212, 214 and 216, and table 710 is divided into shards 712 and 714. Storage layer 130 stores multiple replicas of each of shards 212, 214, 216, 712 and 714 as described above with respect to FIG. 7. FIG. 12 represents a consensus protocol consisting of a leader replica (i.e., denoted by a pronounced outline) and two follower replicas for each shard. The replicas may be distributed across the storage nodes of storage layer 130 based on any suitable algorithm for providing load-balancing and high availability. Scale-out, scale-in, and failure recovery of the nodes shown in FIG. 12 may proceed in the manners described above with respect to FIGS. 9a-9c, 10a-10c and 11a-11c.

Figure 13:
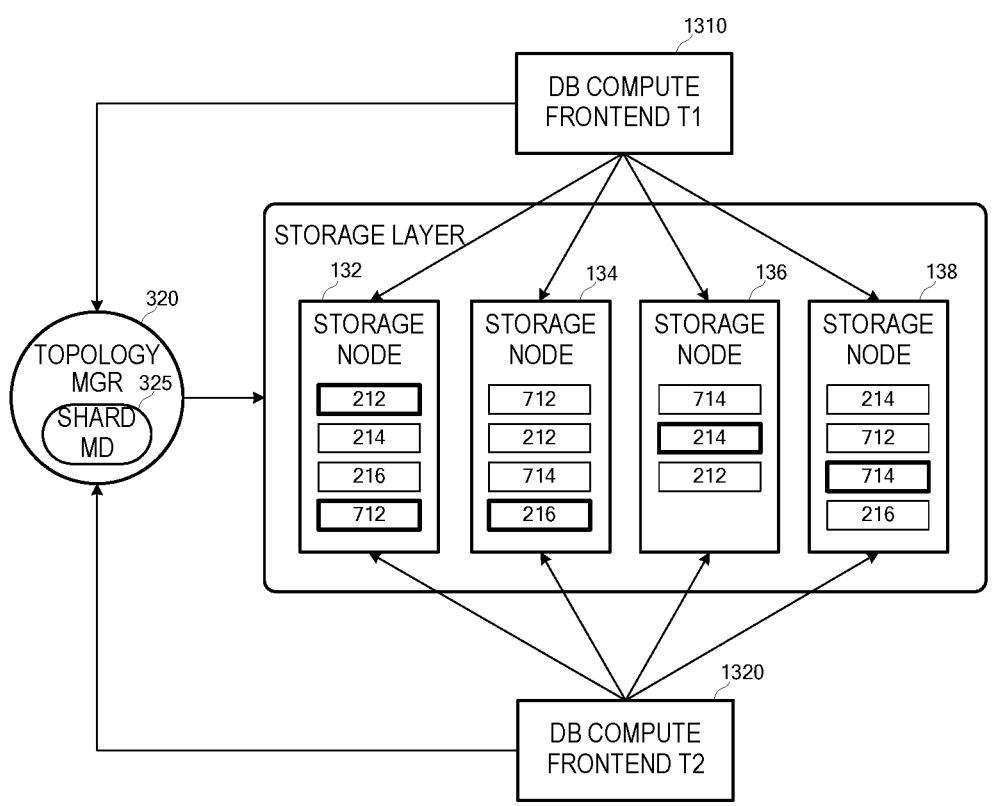
FIG. 13 illustrates access to database table shards of multiple tenants according to some embodiments.

FIG. 13 illustrates access to database table shards of multiple tenants according to some embodiments.

Database compute frontend 1310 serves users of Tenant 1 and database compute frontend 1320 serves users of Tenant 2. Database compute frontend 1310 may comprise a single-tenant database instance executing on a single compute node of a compute layer, and database compute frontend 1320 may comprise a single-tenant database instance executing on another single compute node of the compute layer. In some embodiments, database compute frontend 1310 and database compute frontend 1320 execute on a same compute node.

Topology manager 320 may operate as described above. As also described above, shard metadata 325 may associate each shard with a table identifier, a key range, locations of each replica, and an identifier of a leader replica. However, since table 210 and table 710 conform to different schemas, table identifiers and key ranges of the tables of Tenant 1 might overlap/conflict with table identifiers and key ranges of the tables of Tenant 2. Accordingly, shard metadata 325 also associates each shard with a tenant identifier. If database compute frontends 1310 and 1320 are single-tenant database frontends, the tenant identifier may be an identifier of the container in which the frontends are executing.

In response to a received query, database compute frontend 1310 (or frontend 1320) queries topology manager 320 for the location of the shard(s) associated with the query. The query of topology manager 320 includes a tenant identifier, a table identifier, and a key range (e.g., as a concatenated string). Topology manager 320 determines an identifier of the storage node(s) in which the leader replicas of the desired shard(s) are stored based on the query received from database compute frontend 1310 (or frontend 1320) and shard metadata 325. Database compute frontend 1310 (or frontend 1320) then issues database operations to the node (s) on which the leader replicas shard(s) are stored. The storage nodes may perform these operations in parallel if the shards are located on more than one storage node.

In some embodiments, each tenant is associated with a root shard which includes the shard metadata for the tenant, and topology manager 320 stores the location of the root shard for each tenant. Database compute frontend 1310 or 1320 may therefore query topology manager 320 for the storage node which stores the root shard of a given tenant, read the metadata of the root shard from the storage node, and determine locations of desired shards based on the metadata. Each root shard may also be stored among storage nodes 132-138 in multiple replicas, in which case topology manager 320 stores the location of each replica of each root shard.

Some embodiments include a multi-tenant database compute frontend which serves users of Tenant 1 and users of Tenant 2. The multi-tenant database compute frontend accesses shard replicas as described above with respect to both database compute frontend 1310 and database compute frontend 1320, using an appropriate tenant identifier to query topology manager 320.

Figure 14:
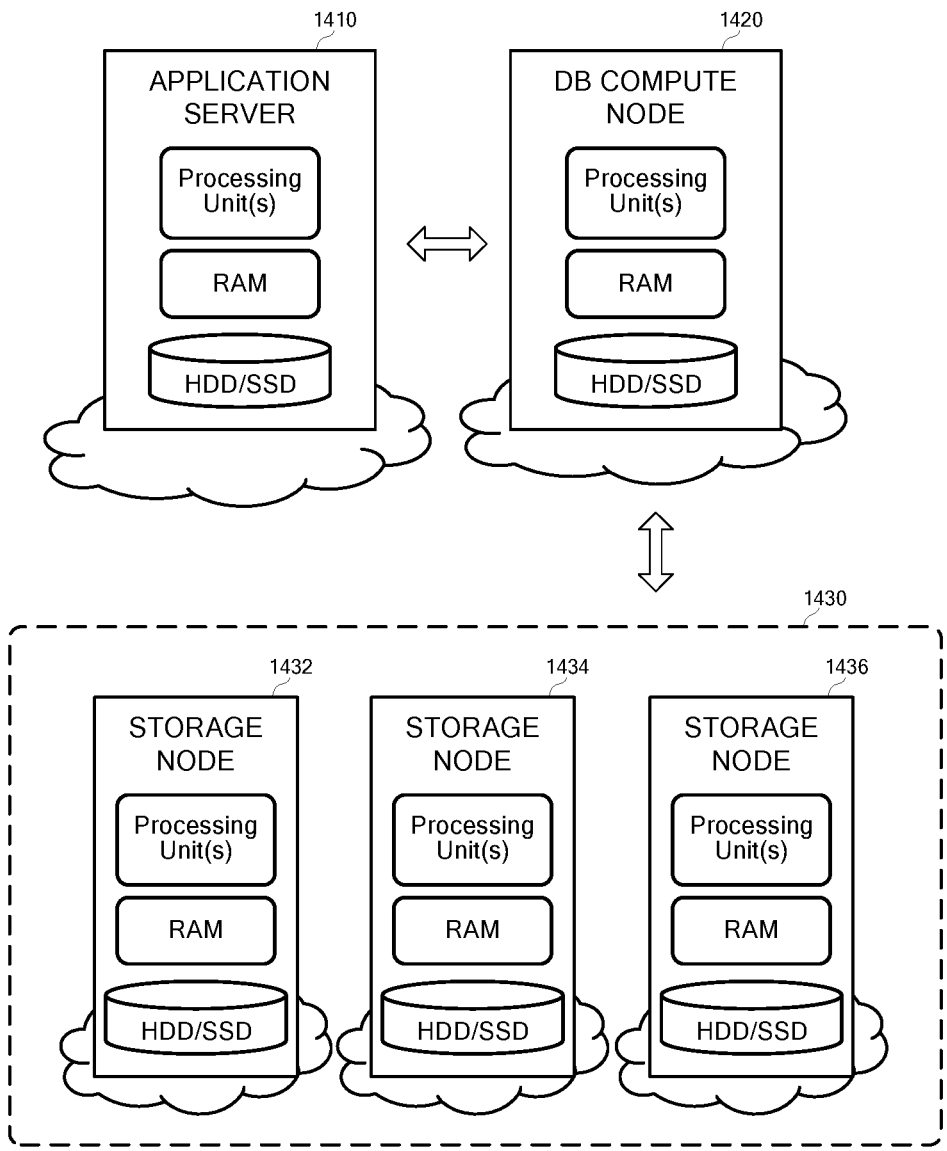
FIG. 14 is a block diagram of cloud-based virtual machines providing a database service according to some embodiments.

FIG. 14 is a block diagram of cloud-based environment according to some embodiments. Each component may be implemented using any suitable combination of hardware and software that is or becomes known. For example, each component may comprise a physical computer server or a virtual machine. Such virtual machines may reside in one or more public clouds providing self-service and immediate provisioning, autoscaling, security, compliance and identity management features.

Application server 1410 executes one or more applications which issue database queries. The applications may be accessed by users (not shown) who request information from the applications, thereby triggering issuance of the database queries. Application server 1410 transmits the queries to database compute node 1420, which executes a database instance (e.g., an indexserver). Based on the queries, the database instance instructs CRUD operations on data stored in storage nodes 1432, 1434 and 1436 of storage layer 1430.

The data is stored in storage nodes 1432, 1434 and 1436 of storage layer 1430 in any manner described above. For example, the data of a given table may be stored in shards distributed throughout storage nodes 1432, 1434 and 1436, and each shard may be replicated across multiple storage nodes. The data may include data of more than one tenant, where each shard of a given tenant is identified in metadata by a tenant identifier, a table identifier and a key range. Database compute node 1420 uses the metadata to determine the locations of shards on which operations are desired.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a first storage node comprising a first processing unit and a first data storage device, the first data storage device storing a first replica of a first shard of a first database table, the first database table associated with a first tenant and conforming to a first tenant schema, and the first shard including a first key range of the first database table;
a second storage node comprising a second processing unit and a second data storage device, the second data storage device storing a second replica of the first shard of the first database table;
a third storage node comprising a third processing unit and a third data storage device, the third data storage device storing a third replica of the first shard of the first database table;
a fourth storage node comprising a fourth processing unit and a fourth data storage device, the fourth data storage device storing a first replica of a second shard of the first database table, and the second shard including a second key range of the first database table;
a fifth storage node comprising a fifth processing unit and a fifth data storage device, the fifth data storage device storing a second replica of the second shard of the first database table; and
a sixth storage node comprising a sixth processing unit and a sixth data storage device, the sixth data storage device storing a third replica of the second shard of the first database table,
wherein the first data storage device stores a first replica of a third shard of a second database table associated with a second tenant and conforming to a second tenant schema different from the first tenant schema, and the third shard includes a third key range of the second database table.

2. A system according to claim 1, further comprising:
a seventh storage node comprising a seventh processing unit and a seventh data storage device, the seventh data storage device storing a second replica of the third shard of the second database table; and
a eighth storage node comprising a eighth processing unit and a eighth data storage device, the eighth data storage device storing a third replica of the third shard of the second database table.

3. A system according to claim 2, further comprising:
a first tenant root shard including first metadata associating the first shard with the first tenant, the first database table, the first key range, the first storage node, the second storage node and the third storage node; and a second tenant root shard including second metadata associating the second shard with the second tenant, the second database table, the third key range, the fourth storage node, the fifth storage node and the sixth storage node.

4. A system according to claim 3, wherein the system stores a plurality of replicas of the first tenant root shard and a plurality of replicas of the second tenant root shard.

5. A system according to claim 1, further comprising:
a first tenant root shard including first metadata associating the first shard with the first tenant, the first database table, the first key range, the first storage node, the second storage node and the third storage node; and
a second tenant root shard including second metadata associating the second shard with the second tenant, the second database table, the third key range, the fourth storage node, the fifth storage node and the sixth storage node.

6. A system according to claim 5, wherein the system stores a plurality of replicas of the first tenant root shard and a plurality of replicas of the second tenant root shard.

7. A system according to claim 1, further comprising:
a manager node comprising a seventh processing unit and a seventh data storage device, the manager node to:
detect a failure of the first storage node, and
in response to detection of the failure, instruct the second storage node to copy the second replica of the first shard to the sixth storage node.

8. A system comprising:
a first storage node comprising a first processing unit and a first data storage device, the first data storage device storing a first shard of a first database table, the first database table associated with a first tenant and conforming to a first tenant schema, and the first shard including a first key range of the first database table;
a second storage node comprising a second processing unit and a second data storage device, the second data storage device storing a second shard of the first database table and a third shard of a second database table associated with a second tenant and conforming to a second tenant schema different from the first tenant schema, the second shard including a second key range of the first database table and the third shard including a third key range of the second database table;
a third storage node comprising a third processing unit and a third data storage device; and
a manager node comprising a fourth processing unit and a fourth data storage device, the manager node to instruct the first storage node to divide the first shard into a third shard associated with a third key range and a fourth shard associated with a fourth key range, to store the third shard in the first data storage device of the first storage node, and to store the fourth shard in the third data storage device of the third storage node.

9. A system according to claim 8, further comprising:
a fourth storage node comprising a fourth processing unit and a fourth data storage device, the fourth data storage device storing a fifth shard of the first database table, and the fifth shard including a fifth key range of the first database table,
wherein the manager node is to:

instruct the fourth storage node to merge the second shard with the fifth shard to create a sixth shard associated with a sixth key range including the second key range and the fifth key range;
instruct the second storage node to delete the second shard; and
decommission the second storage node.

10. A computer-implemented method comprising:
determining a first shard of a first database table and a second shard of the first database table, the first database table being a table of a first tenant and conforming to a first tenant schema, the first shard including a first key range of the first database table and the second shard including a second key range of the first database table;
storing a first replica of the first shard of the first database table on a first storage node;
storing a second replica of the first shard of the first database table on a second storage node;
storing a third replica of the first shard of the first database table on a third storage node;
storing a first replica of a second shard of the first database table on a fourth storage node;
storing a second replica of the second shard of the first database table on a fifth storage node;
storing a third replica of the second shard of the first database table on a sixth storage node;
determining a third shard of a second database table, the second database table being a table of a second tenant and conforming to a second tenant schema different from the first tenant schema, and the third shard including a third key range of the second database table;
storing a first replica of the third shard of the second database table on the first storage node;
storing a second replica of the third shard of the second database table on a seventh storage node; and
storing a third replica of the third shard of the second database table on an eighth storage node.

11. A method according to claim 10, further comprising:
storing a first tenant root shard including first metadata associating the first shard with the first tenant, the first database table, the first key range, the first storage node, the second storage node and the third storage node; and
storing a second tenant root shard including second metadata associating the second shard with the second tenant, the second database table, the third key range, the fourth storage node, the fifth storage node and the sixth storage node.

12. A method according to claim 11, further comprising storing a plurality of replicas of the first tenant root shard and a plurality of replicas of the second tenant root shard.

13. A method according to claim 10, further comprising:
detecting a failure of the first storage node, and
in response to detecting the failure, instructing the second storage node to copy the second replica of the first shard to the sixth storage node.

14. A method according to claim 11, further comprising:
detecting a failure of the first storage node, and
in response to detecting the failure, instructing the second storage node to copy the second replica of the first shard to the sixth storage node.

* * * * *